(12) United States Patent
Oh

(10) Patent No.: US 6,293,484 B1
(45) Date of Patent: Sep. 25, 2001

(54) BAIT CASTING REEL HAVING SPOOL DETACHING MECHANISM

(75) Inventor: Chul Suk Oh, Seoul (KR)

(73) Assignee: Shin A Sports Co., Ltd.

( * ) Notice: Subject to any disclaimer, the term of this patent is extended or adjusted under 35 U.S.C. 154(b) by 0 days.

(21) Appl. No.: 09/574,821

(22) Filed: May 19, 2000

(30) Foreign Application Priority Data

May 21, 1999 (KR) .............................. 1999-8741

(51) Int. Cl.[7] .................................. A01K 89/015
(52) U.S. Cl. ............................. 242/312; 242/310
(58) Field of Search ................... 242/310, 311, 242/312, 313, 314; D22/140, 141

(56) References Cited

U.S. PATENT DOCUMENTS

| | | | |
|---|---|---|---|
| 5,370,331 | * | 12/1994 | Sato ...................... 242/313 |
| 5,429,318 | * | 7/1995 | Sato ...................... 242/314 |
| 5,743,479 | * | 4/1998 | Miyazaki et al. ........... 242/312 |
| 5,996,920 | * | 12/1999 | Yamaguchi ............... 242/314 |
| 6,152,444 | * | 8/2000 | Kim ...................... 242/310 |
| 6,189,823 | * | 2/2001 | Kobayashi et al. .......... 242/312 |
| 6,195,444 | * | 2/2001 | Miyazaki ................. 242/310 |
| 6,199,782 | * | 3/2001 | Oishi ..................... 242/312 |
| 6,206,312 | * | 3/2001 | Oh ....................... 242/314 |

FOREIGN PATENT DOCUMENTS

2246692 * 2/1992 (GB) ................... 242/312

* cited by examiner

*Primary Examiner*—Emmanuel M. Marcelo
(74) *Attorney, Agent, or Firm*—Welsh & Katz, Ltd.

(57) ABSTRACT

A bait casting reel for fishing including a reel frame having an opening, a spool rotatably mounted in the opening of the reel frame, and a spool cover, detachably engaged with the frame, for rotatably supporting the spool. The reel frame is provided on an inner periphery of the opening with a first engaging protrusion having a predetermined number of cutouts, a second engaging protrusion, and an engaging groove formed between the first and second protrusions and extended along the entire length of the inner periphery of the opening. A locking member is provided adjacent to the opening of the reel frame, for contacting a portion of the spool supporting cover to prevent the cover from rotating. The spool supporting cover includes a circular engaging edge engaged with the reel frame, and inserted into the cutout of the first engaging protrusion to guide the cover along the engaging groove.

6 Claims, 5 Drawing Sheets

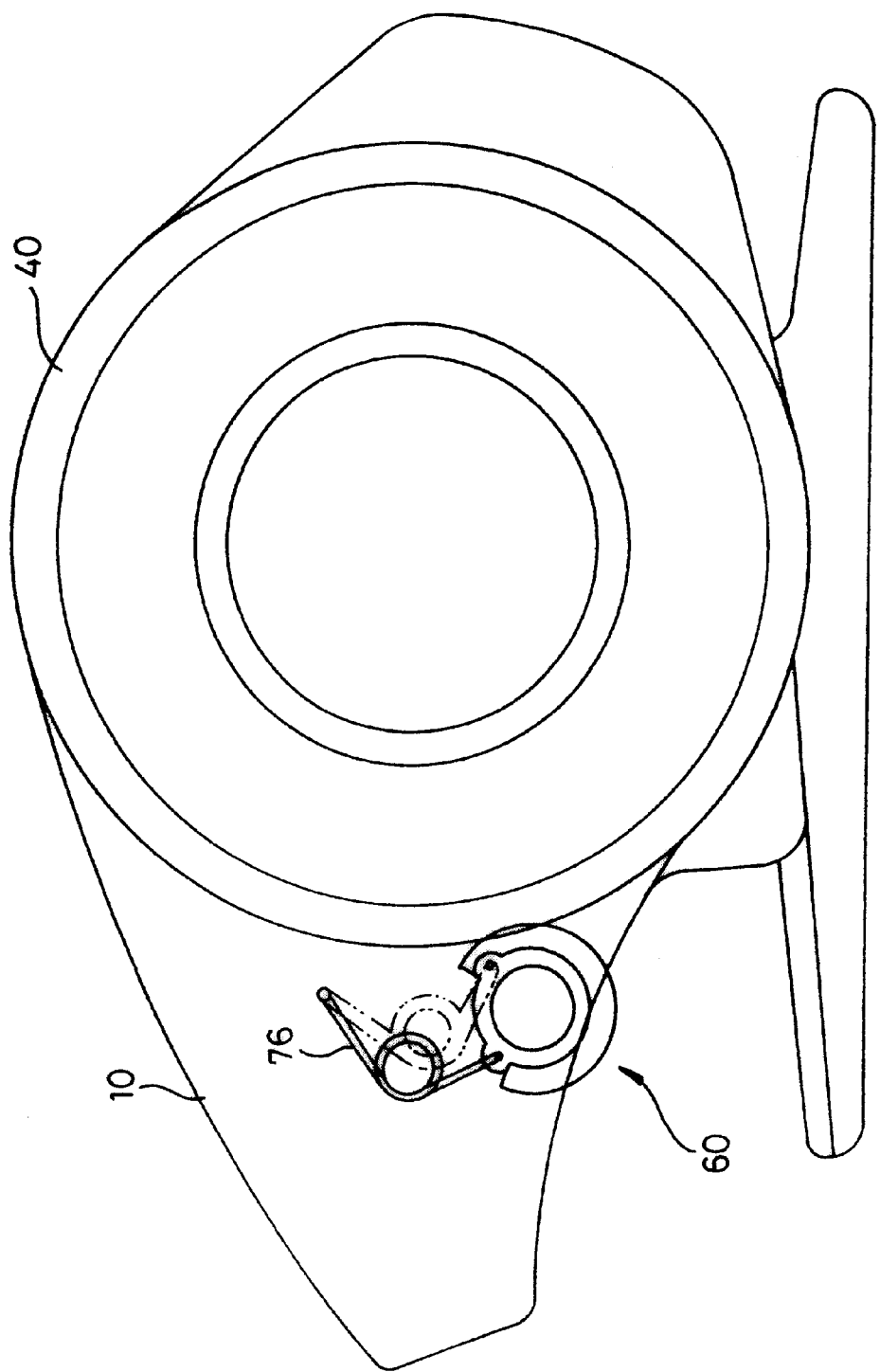

BAIT CASTING REEL HAVING SPOOL DETACHING MECHANISM

BACKGROUND OF THE INVENTION

1. Field of the Invention

The present invention relates to a bait casting reel, and more particularly to a bait casting reel having a spool detaching mechanism to easily attach or detach a spool to or from the reel

2. Description of the Related Art

Bait casting reels are generally constructed in such a way that a pinion is rotated with a gear train driven in response to rotation of a handle, and a spool is rotated in the winding direction by transmitting the rotating force of the pinion to a spool shaft.

Such a bait casting reel comprises a driving shaft provided in one side plate of a red frame thereof and rotated in response to the rotation of the handle, and a plurality of gears meshed with a drive gear. The reel frame is provided with on the other side plate with a spool support. An example of such a bait casting reel having a spool support is disclosed in Japanese Unexamined Utility-Model Publication Nos. Hei 4-38267, Hei 5-60271, Hei 7-17064 and Japanese Utility-Model Publication No. Hei 8-10279.

According to the bait casting reel disclosed in the Japanese Unexamined Utility-Model Publication No. Hei 8-10279, the spool shaft provided in one side plate of the reel is rotatably supported by the bearing portion of the spool support inserted to be attachable and detachable to and from an opening formed on the one side plate of the reel. The bait casting reel comprises a proper number of engaging shoulders protruded radially and outwardly from an inner periphery of the opening, an engaging pin inserted in the side plate of the reel, the front end of which is biased toward the diametrical center of the opening by a spring to freely protrude from the inner periphery of the opening, an engaging edge protruded from the outer periphery of the spool support and having a cutout to receive the engaging shoulder when the support is inserted into the opening, and latch/ unlatch recesses into which the engaging pin is inserted. The cutout is formed so that the engaging shoulder can be inserted and passed through.

With the construction the engaging edge can be engaged with the engaging shoulder to latch the spool support when the engaging pin is fitted into the latch recess, while the cutout of the engaging edge can be associated with the engaging shoulder to unlatch the spool support when the engaging pin is fitted into the unlatch recess.

The bait casting reel disclosed in Japanese Utility-Model Publication No. Hei 8-10279 has a problem that the axial length of the spool support is increased because the engaging edge with the cutout, and the latch and unlatch recesses must be formed in series in the axial direction on the same peripheral line of the spool support.

SUMMARY OF THE INVENTION

Accordingly, an object of the invention is to to solve the problems stated above, provide a bait casting reel having a spool detaching mechanism to easily attach or detach a spool to or from the reel.

Another object of the invention is to provide a bait casting reel with a spool detaching mechanism, which has a simple structure and can be easily opened with a single manipulation.

Still another object of the invention is to provide a bait casting reel which can minimize a clearance between the main body of the reel and the spool detaching mechanism for a smooth operation of the spool.

Still another object of the invention is to provide a spool detaching mechanism having a drag mechanism that can control the drag force of the spool.

To achieve the above and other objects, according to one aspect of the invention, there is provided with a bait casting reel for fishing including a reel frame having an opening, a spool rotatably mounted in the opening of the reel frame, and a spool cover, detachably engaged with the frame, for rotatably supporting the spool, the bait casting reel comprising:

the reel frame provided on an inner periphery of the opening with a first engaging protrusion having a predetermined number of cutouts, a second engaging protrusion and an engaging groove formed between the first and second protrusions and extended along the entire length of the inner periphery of the opening;

a locking member, provided adjacent to the opening of the reel frame, for contacting a portion of the spool supporting cover to prevent the cover from rotating; and the spool supporting cover including a circular engaging edge engaged with the reel frame, and inserted into the cutout of the first engaging protrusion to guide the cover along the engaging groove.

According to another aspect of the present invention, there is provided with a bait casting reel for fishing including a reel frame having an opening, a spool rotatably mounted in the opening of the reel frame, and a spool detaching mechanism, detachably engaged with the frame, for rotatably supporting the spool, the bait casting reel comprising:

the reel frame provided on an inner periphery of the opening with a first engaging protrusion having a predetermined number of cutouts, a second engaging protrusion, and an engaging groove formed between the first and second protrusions and extended along the entire length of the inner periphery of the opening;

the spool detaching mechanism including a cover engaged with the opening of the reel frame, and drag means fixed onto the cover to apply drag force to the spool; and the cover including a circular engaging edge engaged with the reel frame, and inserted into the cutout of the first engaging protrusion to guide the cover along the engaging groove, and a locking member provided adjacent to the opening of the reel frame.

In the embodiment, the locking member comprises a locking portion formed along an outer periphery thereof, and an unlocking portion formed adjacent to the locking portion and having an outer diameter smaller than that of the locking portion, the locking and unlocking portions being selectively positioned in a circular recess formed on an outer surface of the spool supporting cover as the locking member rotates.

The drag mechanism comprises an adjusting knob slightly protruded rotatably inserted through the opening at the center of the cover, a cylindrical spool support, a movable member having a shape of a hollow cylinder and threaded into the inner periphery of the adjusting knob, the movable member being moved axially by the rotation of the knob, a circular fixing plate connected to one end of the Movable member, and a pair of permanent magnets connected to the circular fixing plate.

BRIEF DESCRIPTION OF THE DRAWINGS

The above objects, other features and advantages of the present invention will become more apparent by describing the preferred embodiment thereof with reference to the accompanying drawings, in which

FIG. 7 is a view illustrating an operated state of the rotatable locking member.

DETAILED DESCRIPTION OF THE PREFERRED EMBODIMENT

The construction and operation of the present invention will be explained in detail with reference to the accompanying drawings.

Figure 1:
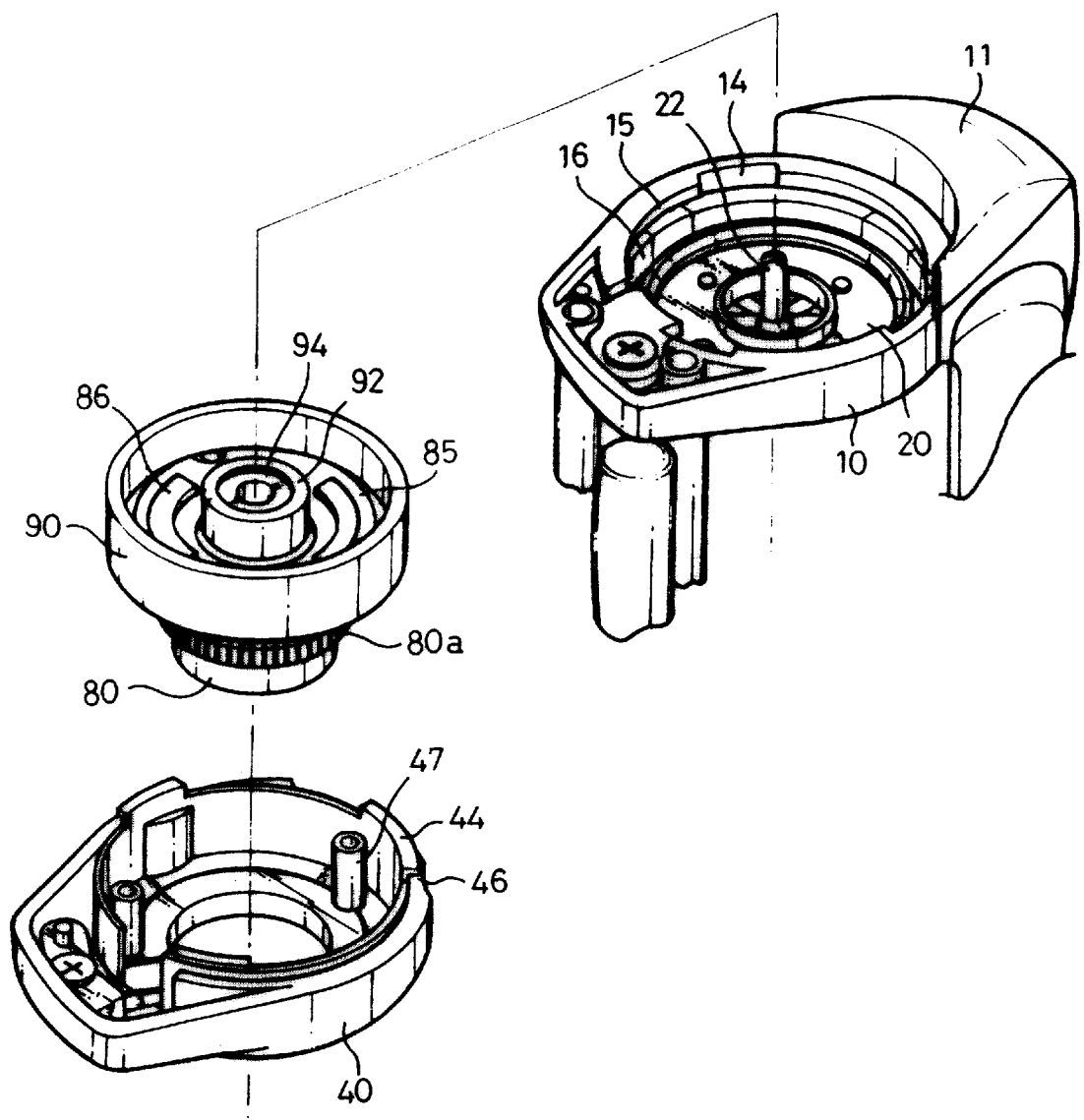
FIG. 1 is a perspective view of a bait casting reel having a spool detaching mechanism according to a preferred embodiment of the invention.
Figure 2:
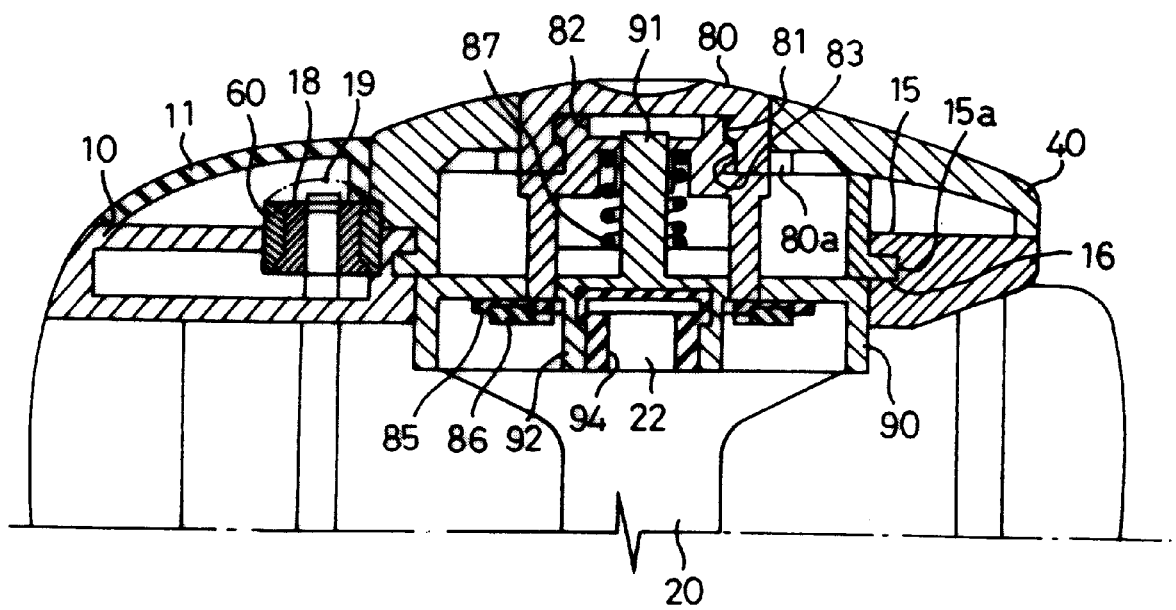
FIG. 2 is a cross-sectional view of FIG. 2.

FIG. 1 shows a spool detaching mechanism and a frame of a bait casting reel according to the invention, and FIG. 2 shows the engaging state of the componentes. The bait casting reel for fishing according to the invention comprises a reel frame 10 having an opening, a spool 20 rotatably received in the opening of the reel frame 10, and a spool detaching mechanism, detachably engaged with one side of the reel frame 10, for supporting the spool rotatably.

The reel fame 10 comprises a push lever for kicking the operation of the reel, a handle fixed rotatably to a side of the frame oppose to the spool detaching mechanism, and a gear train for transmitting the rotating force of the handle to the spool. Generally, the rotating force of the handle is transmitted to a pinion connected to a spool shaft through a drive gear, and, simultaneously, transmitted to an idle gear connected with a worm gear. Those components are widely known to those who skilled in the prior art, and so the detail description thereof will be omitted.

The spool detaching mechanism according to the invention comprises a cover 40 for covering the opened side of the reel frame 10, and a drag mechanism for applying the drag force to the spool 20. The cover 40 includes a circular engaging edge 44 on the under side thereof, and a fixing portion 47 provided with a female threaded portion therein. The drag mechanism is fixed on the fixing portion 47 of the cover by means of a screw.

The drag mechanism comprises an adjusting knob 80 slightly protruded outwardly and upwardly through the opening at the center of the cover 40, a cylindrical spool support 90, a movable member inserted coaxially into the protrusion 91 of the spool support 90, threaded into the inner periphery of the adjusting knob and movable axially by the rotation of the knob 80, a circular fixing plate 85 connected to one end of the movable member 82, and a pair of permanent magnets 86 fixed to the circular fixing plate 85.

The movable member 82 is always biased by a spring 87 in an upper direction, and the force of spring is transferred to the adjusting knob 80 positioned in the outer most. The knob 80 has a toothed engaging portion 80a contacted with the inner surface of the cover 40, such that the knob is not released outwardly from the cover. The spool support 90 has a bushing fixing portion 92 in which a bushing 94 for supporting the shaft 22 of the spool 20 is inserted in its center.

The rotating force of the knob 80 causes the movable member 82 to moves linearly by the relative movement between a female threaded portion 81 of the knob 80 and a male threaded portion 83 of the movable member 82. Accordingly, the movable member 82 moves up and down along the axial direction, such that the fixing plate 85 fixed on the movable member 82 can be moved toward or apart from the spool 20. The more the permanent magnetic 86 fixed to the movable member 82 moves toward the spool 20 of metal, the more the drag force is increased.

Figure 3:
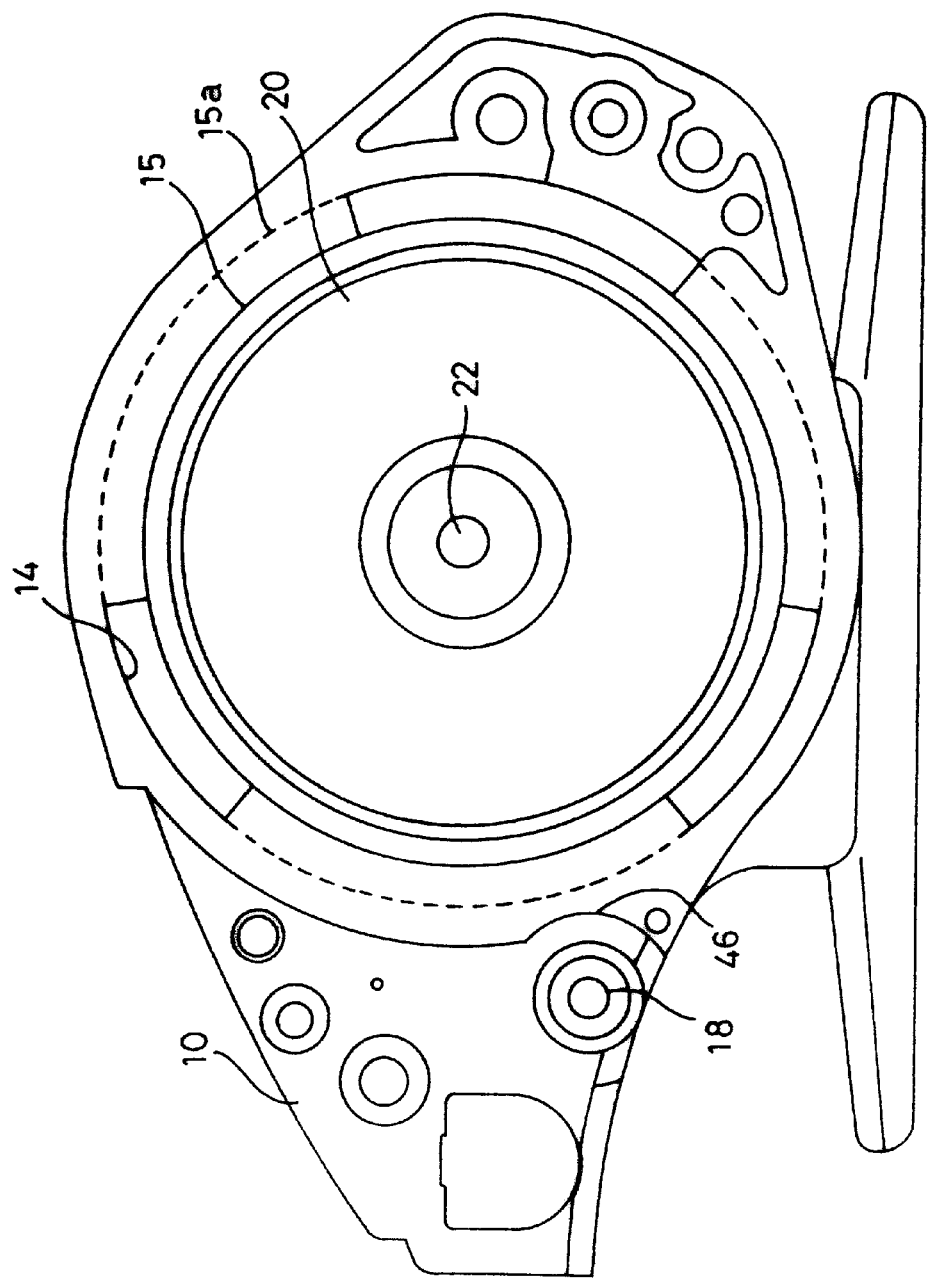
FIG. 3 is a side elevational view of a main body of the bait casting reel.

Referring to FIG. 3, it will now be explained in detail on the side of the reel frame to which the cover 40 is attached. On the inner periphery of the opening of the reel frame 10 with the spool 20 to be mounted, a first engaging protrusion 15 having a predetermined number (in the embodiment, three) of engaging cutouts 14, and a second engaging protrusion 16 with no cutout. An engaging groove 15a is provided between the first and second protrusions 15 and 16 and extended along the entire length of the inner periphery of the opening. The engaging groove 15a is shown in a dotted line in FIG. 3.

Also, the side plate of the reel frame 10 is provided adjacent to the opening of the reel frame with a cylindrical boss 18, into which a locking member 60 is rotatably inserted. The boss 18 has a threaded opening so that a round bead screw 19 is threaded into the opening.

Figure 4:
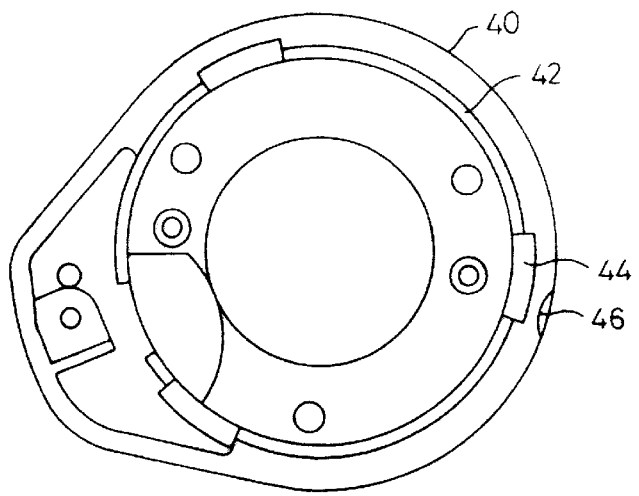
FIG. 4 is a bottom view of a cover according to the invention.

The cover shown in FIG. 4 comprises a cylindrical support 42 protruded from the body of cover, and a number of circular engaging edges 44 protruded from the upper end of the support 42 The circular engaging edge 44 is engaged with the reel frame, and inserting into the cutout 14 of the first engaging protrusion 15 to guide the cover along the engaging groove 15a (FIG. 2). The circular engaging edge 44 is constructed so that it is to prevent the edge from moving axially or releasing from the engaged state.

The cover 40 has a circular recess 46 on a portion of the outer periphery thereof. The recess 46 is inserted with a portion of the outer periphery of the rotatable locking member 60, which will be explained hereinafter in detail. Accordingly, the cover 40 can not be rotated left or right with the outer periphery of the rotatable locking member 60 being inserted into the recess 46.

Figure 5:
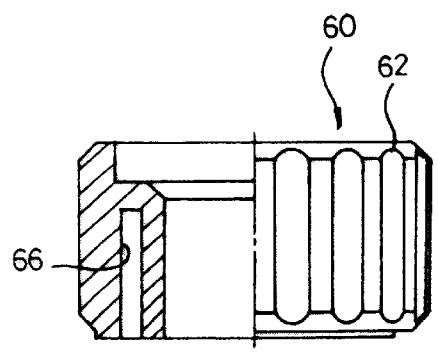
FIG. 5 is a sectional view of a rotatable locking member.
Figure 6:
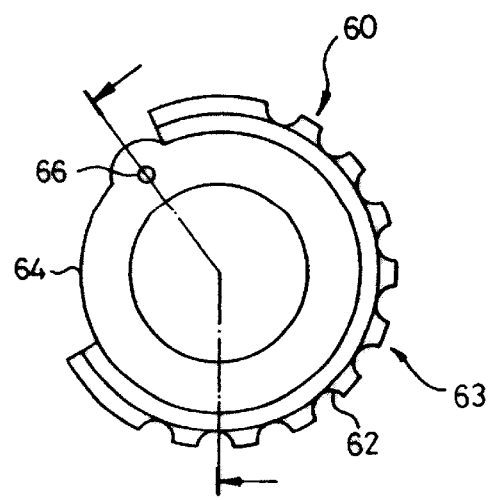
FIG. 6 is a bottom view of a rotatable locking member.

FIGS. 5 and 6 are a cross sectional view and a bottom view illustrating the rotatable locking member 60, respectively. The rotatable locking member 60 is made in a shape of a hollow cylinder. The locking member 60 comprises on the outer periphery thereof a locking portion 63 with slop preventing grooves 62, and an unlocking portion 64 formed adjacent to the locking portion 63 and having an outer diameter smaller than that of the locking portion. Preferably, the unlocking portion 64 is formed on a quarter of the outer periphery, as shown in FIG. 6. The locking and unlocking portions 62 and 64 may be selectively positioned in the circular recess formed on an outer surface of the spool supporting cover due to rotation of the locking member 60.

The rotatable locking member 60 has a hole 66 for receiving a wire spring extending upwardly from the bottom of the unlocking portion 64. The wire spring 76 has one end fixed on the side plate of the reel, and the other end fixed to the hole 66 of the rotatable locking member 60, as shown in FIG. 7.

With the construction, when the rotatable locking member 60 is positioned as the wire spring is positioned as shown in a solid line, the cover 40 can not rotate in the opening of the reel. When the rotatable locking member 60 is rotated as the wire spring is positioned as shown in a one-dotted line, the cover can rotate in the opening. Specifically, when the rotatable locking member 60 rotates in a clockwise in FIG.

7, the locking portion of the locking member 60 is positioned in the recess 46 of the cover, In that state, since the cover is not contacted with any portion of the rotatable locking member, the cover can rotate in the opening of the reel.

Although the present invention has been described with reference to the drawings, it is understood that this description is not to limit the invention to the embodiments shown in the drawings but simply to explain the invention. One skilled in the art will understand that various changes and modifications can be made from the embodiments disclosed in the specification. Therefore, the scope of the present invention should be defined by the appended claims.

What is claimed is:

1. A bait casting reel for fishing including a reel frame having an opening, a spool rotatably mounted in the opening of the reel frame, and a spool cover, detachably engaged with the frame, for rotatably supporting the spool, the bait casting reel comprising:

the reel frame provided on an inner periphery of the opening with a first engaging protrusion having a predetermined number of cutouts, a second engaging protrusion, and an engaging groove formed between the first and second protrusions and extended along the entire length of the inner periphery of the opening;

a locking member, provided adjacent to the opening of the reel frame, for contacting a portion of the spool supporting cover to prevent the cover from rotating; and the spool supporting cover including a circular engaging edge engaged with the reel frame, and inserted into the cutout of the first engaging protrusion to guide the cover along the engaging groove.

2. The bait casting reel as claimed in claim 1, wherein the locking member is a cylindrical member, is fitted and fixed in a cylindrical boss protruded upwardly from the reel frame by a screw.

3. The bait casting reel as claimed in claim 2, wherein the locking member comprises a locking portion formed along an outer periphery thereof, and an unlocking portion formed adjacent to the locking portion and having an outer diameter smaller than that of the locking portion, the locking and unlocking portions being selectively positioned in a circular recess formed on an outer surface of the spool supporting cover as the locking member rotates.

4. A bait casting reel for fishing including a reel frame having an opening, a spool rotatably mounted in the opening of the reel frame, and a spool detaching mechanism, detachably engaged with the frame, for rotatably supporting the spool, the bait casting reel comprising:

the reel frame provided on an inner periphery of the opening with a first engaging protrusion having a predetermined number of cutouts, a second engaging protrusion, and an engaging groove formed between the first and second protrusions and extended along the entire length of the inner periphery of the opening;

the spool detaching mechanism including a cover engaged with the opening of the reel frame, and drag means fixed onto the cover to apply drag force to the spool; and the cover including a circular engaging edge engaged with the reel frame, and inserted into the cutout of the first engaging protrusion to guide the cover along the engaging groove, and a locking member provided adjacent to the opening of the reel frame.

5. The bait casting reel as claimed in claim 4, wherein the locking member comprises a locking portion formed along an outer periphery thereof, and an unlocking portion formed adjacent to the locking portion and having an outer diameter smaller than that of the locking portion, the locking and unlocking portions being selectively positioned in a circular recess formed on an outer surface of the spool supporting cover as the locking member rotates.

6. The bait casting reel as claimed in claim 4, wherein the drag mechanism comprises an adjusting knob slightly protruded rotatably inserted through the opening at the center of the cover, a cylindrical spool support, a movable member having a shape of a hollow cylinder and threaded into the inner periphery of the adjusting knob, the movable member being moved axially by the rotation of the knob, a circular fixing plate connected to one end of the movable member, and a pair of permanent magnets connected to the circular fixing plate.

* * * * *